June 1, 1948. J. C. GRETTER 2,442,685
CRADLE MOLD FOR MOLDING CONCRETE BLOCKS
Filed July 21, 1945 6 Sheets-Sheet 1
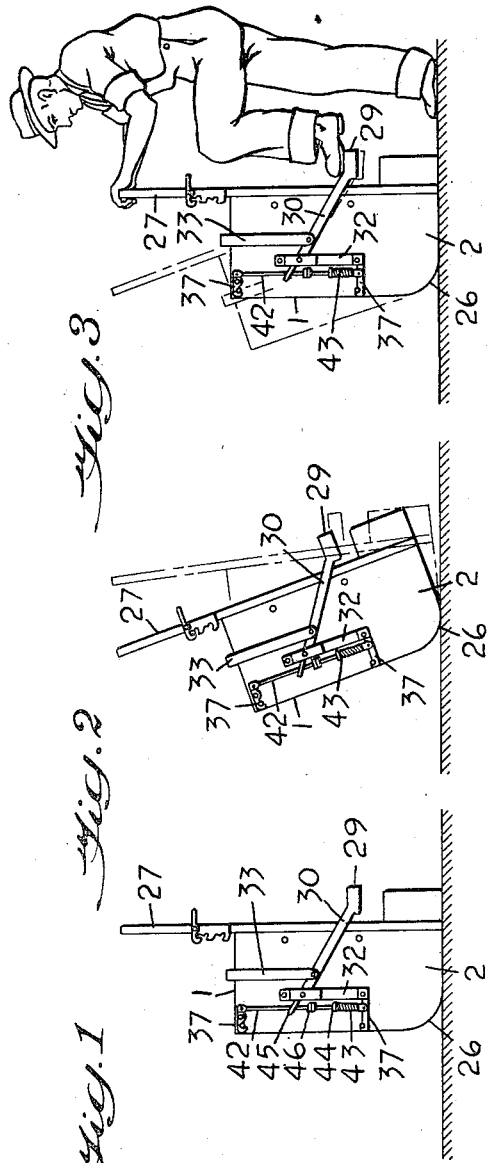
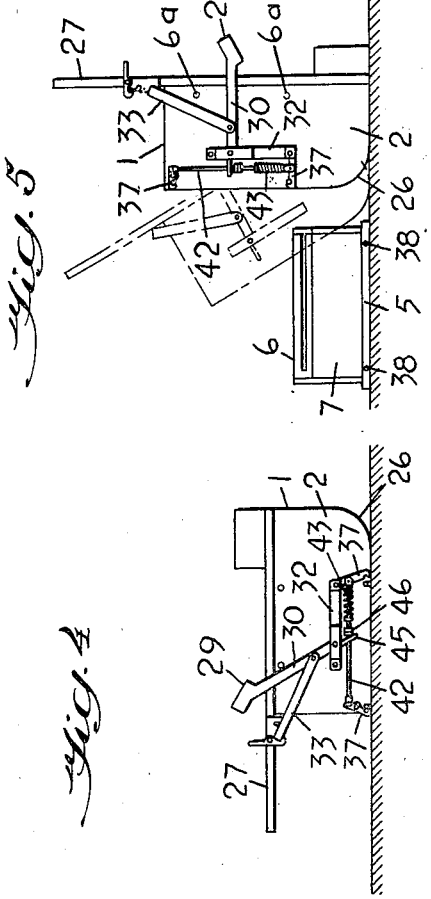
Inventor
Joseph C. Gretter June 1, 1948. J. C. GRETTER 2,442,685
CRADLE MOLD FOR MOLDING CONCRETE BLOCKS
Filed July 21, 1945 6 Sheets-Sheet 2
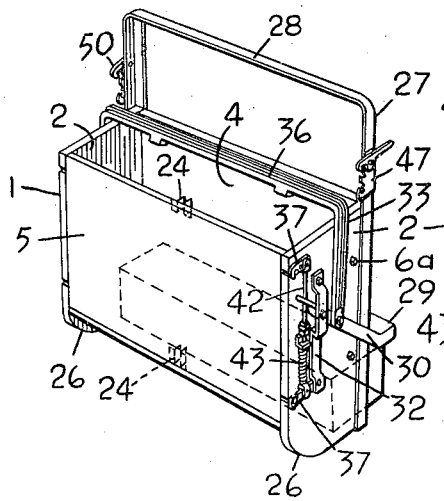
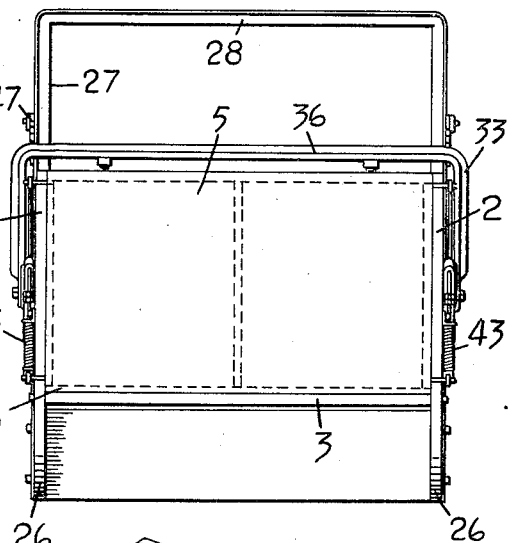
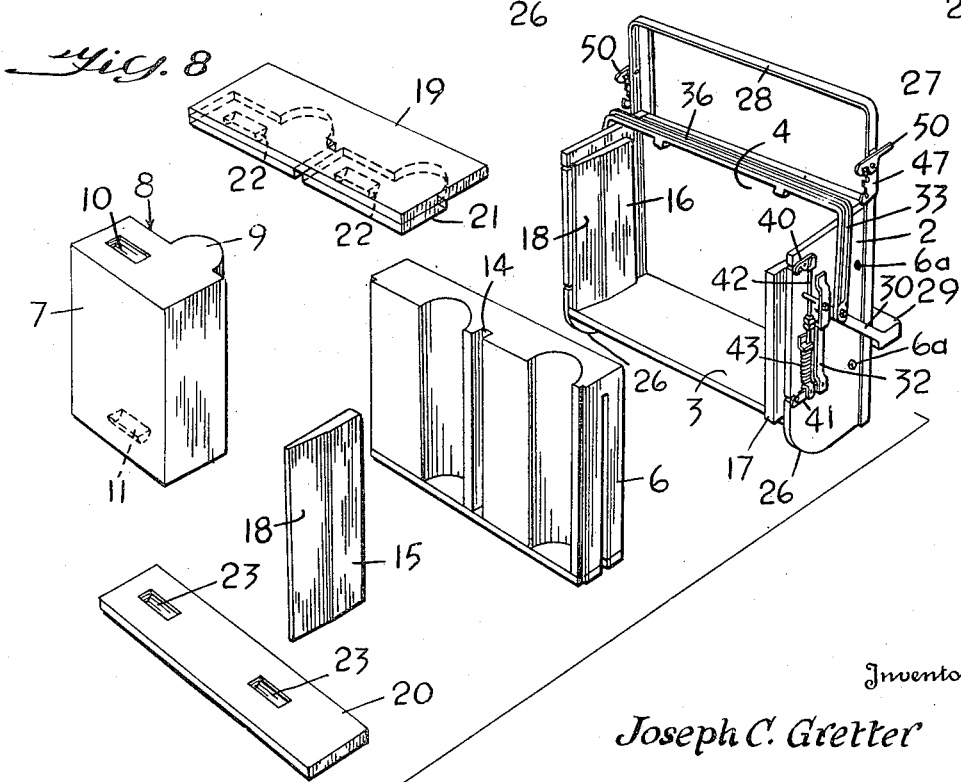
Inventor
Joseph C. Gretter

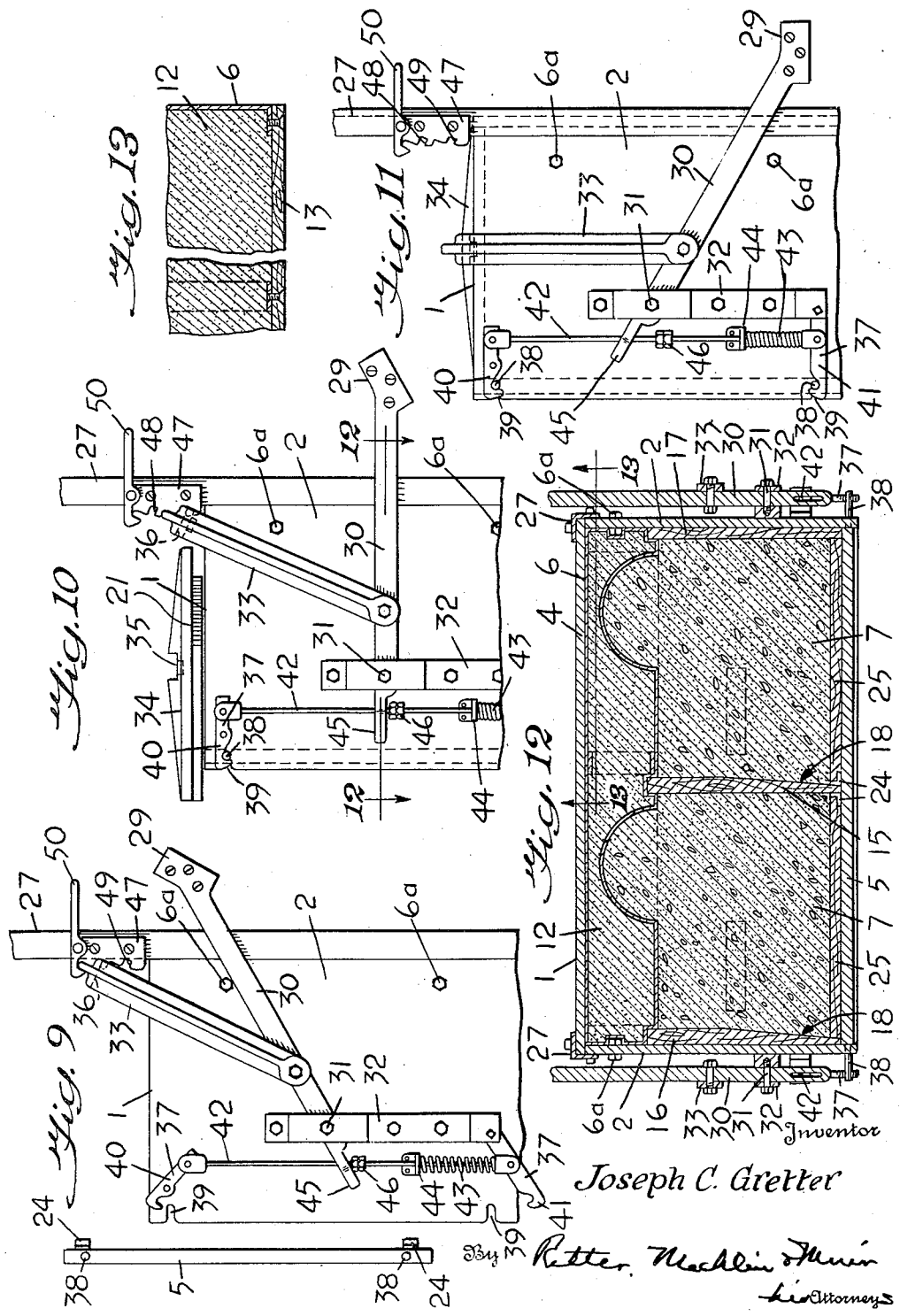

June 1, 1948. J. C. GRETTER 2,442,685
CRADLE MOLD FOR MOLDING CONCRETE BLOCKS
Filed July 21, 1945 6 Sheets-Sheet 4
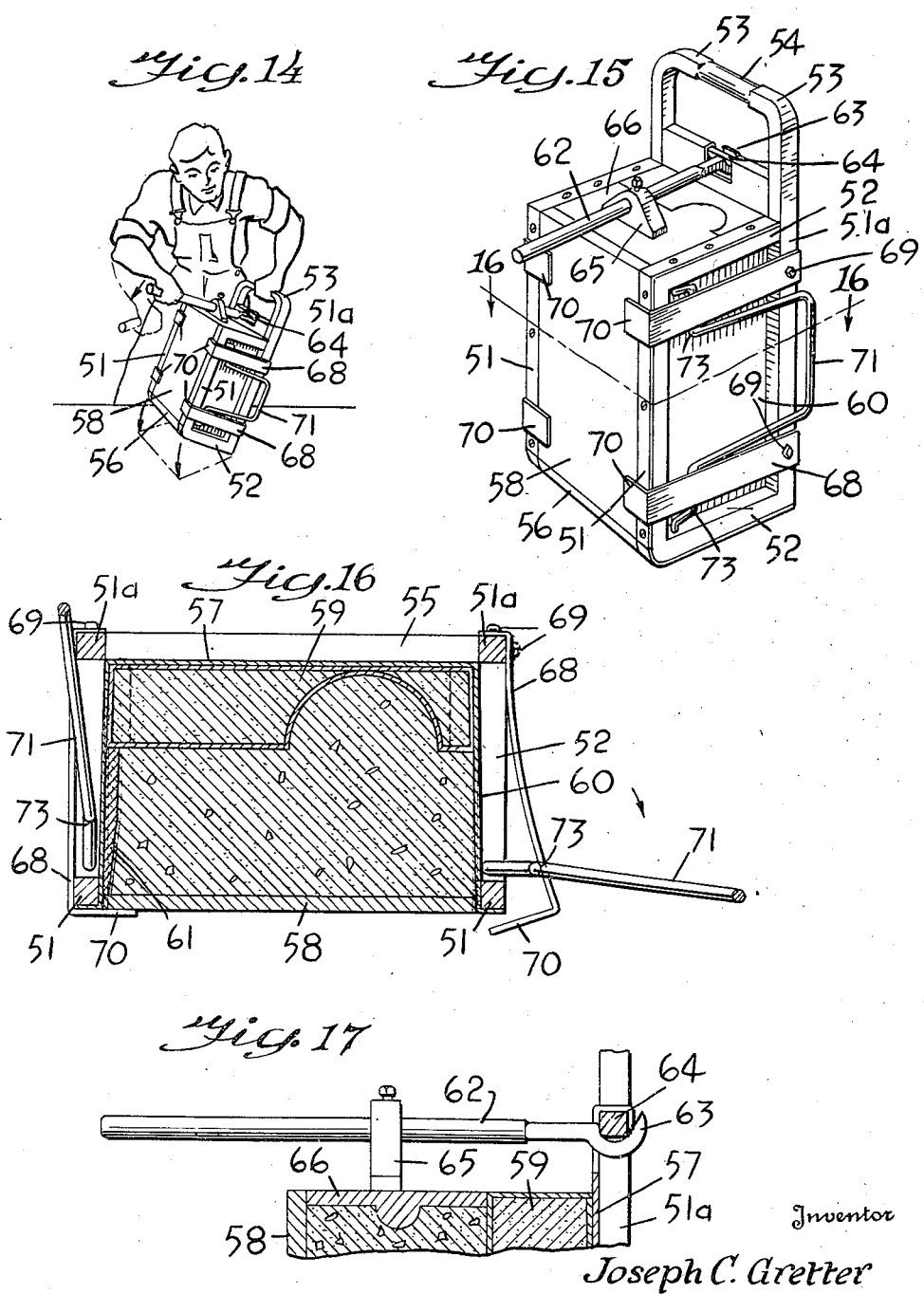
Inventor
Joseph C. Gretter
By Ritter, Mackler & Meanin
Attorneys June 1, 1948. J. C. GRETTER 2,442,685
CRADLE MOLD FOR MOLDING CONCRETE BLOCKS
Filed July 21, 1945 6 Sheets-Sheet 5
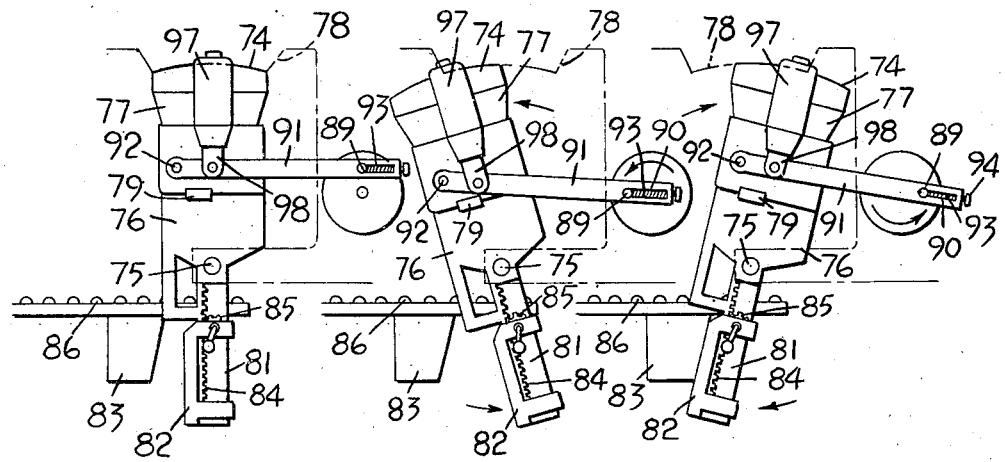
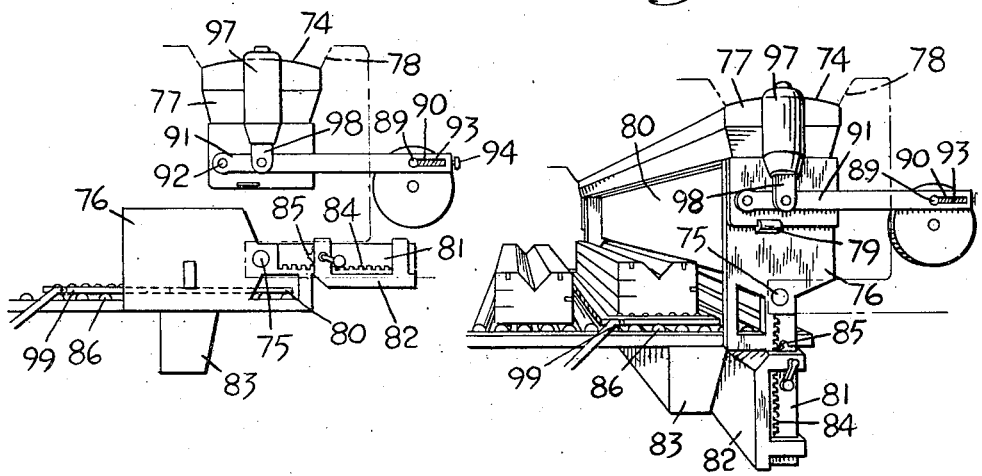
Inventor
Joseph C. Gretter June 1, 1948. J. C. GRETTER 2,442,685
CRADLE MOLD FOR MOLDING CONCRETE BLOCKS
Filed July 21, 1945 6 Sheets-Sheet 6
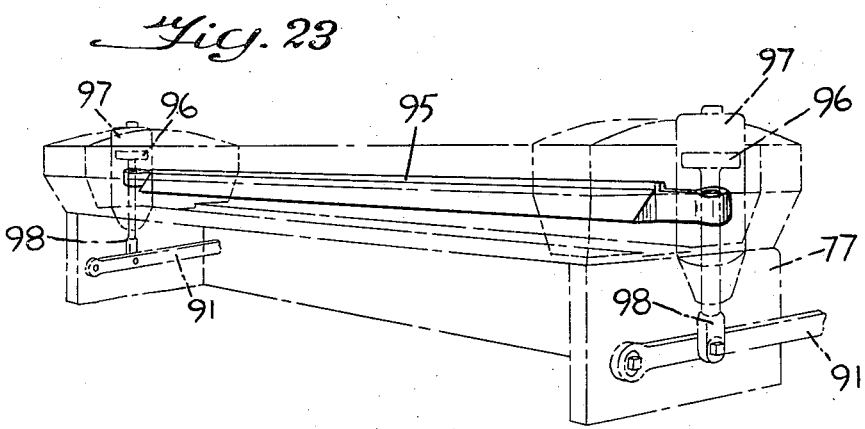
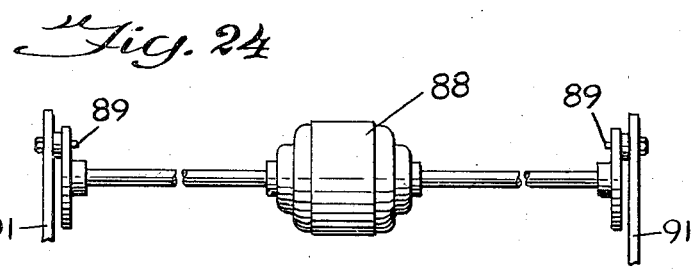
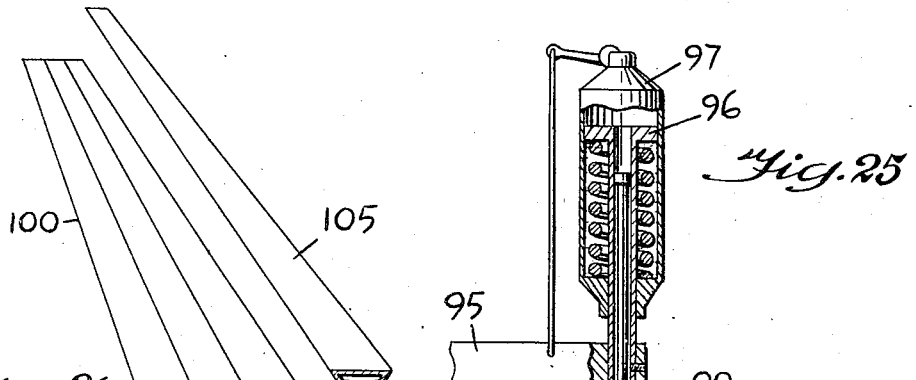
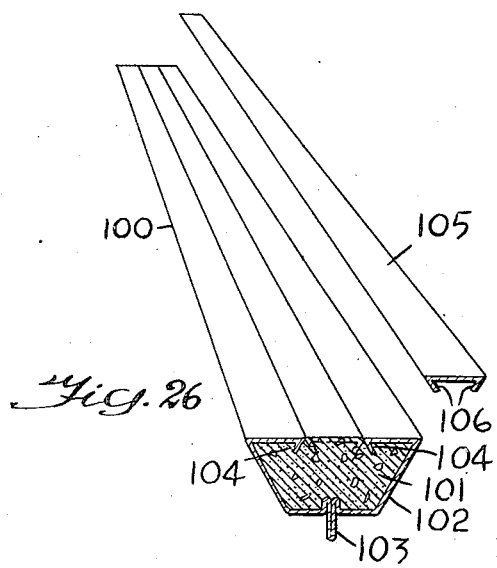
Inventor
Joseph C. Gretter Patented June 1, 1948

2,442,685

UNITED STATES PATENT OFFICE 2,442,685

CRADLE MOLD FOR MOLDING CONCRETE BLOCKS

Joseph C. Gretter, Norwalk, Conn.

Application July 21, 1945, Serial No. 606,371

20 Claims. (Cl. 25—41)

My invention relates to cradles or the like in which cement forms of desired shape or design may be produced and it has for its principal object the provision of a cradle which can be easily rocked to and fro to strike an abutment in one direction of its movement to cause the cement therein to settle into a compact mass.

Another object of the invention is to transmit to the cement in the cradle a supplementary downwardly acting force during the settling operation.

A further object of the invention is to provide a cradle which may be manually operated with ease at the location where the cement forms are desired for use and one which can be readily moved or shipped from place to place.

One of the features of the invention consists in providing a cradle with means for rocking it to and fro to cause it to forcibly engage an abutment in one direction of its rocking movement to jolt the cement which has been deposited therein to cause it to settle in a compact mass, and in associating with the cradle means which is operable during the jolting operation for transmitting a downwardly acting force to the cement.

Another feature of the invention consists in providing a cradle having a cavity in which cement is adapted to be introduced in a substantially fluid condition, one side of the cavity being formed by a mold and the opposite side thereof being formed by a movably connected wall so that after the cement form partially hardens it may be readily discharged from the body.

Other features of the invention applicable to only certain ones of the three embodiments of the invention here described and those which reside in advantageous forms, combinations and relations of parts will hereinafter appear and be pointed out in the claims.

In the drawings,

Figure 1 is a side elevational view of the cradle of one embodiment of the invention which is especially adapted to produce two or more cement blocks.

Figure 2 is a side elevational view of the cradle of Figure 1 showing it in a position in which it has been rocked forward during the jolting operation.

Figure 3 is a side elevational view similar to Figure 1 additionally showing a workman, after the cradle has been rocked back to its upright position.

Figure 4 is a side elevational view of the cradle showing it as having been rocked forward into a position for discharging the cement form.

Figure 5 is a side elevational view showing the cradle in an upright position and the form which has been discharged therefrom.

Figure 6 is a perspective view of the cradle.

Figure 7 is a front elevational view of the cradle.

Figure 8 is a disassembled perspective view of the cradle, a concrete mold, plates used in the cradle and one of the cement blocks which may be formed therein.

Figure 9 is a detail side elevational view of the upper portion of the cradle showing the front side wall thereof detached therefrom and the mechanism by which a downwardly acting force is transmitted to the cement in inoperative position.

Figure 10 is a view similar to Figure 9 showing the top of the cradle body detached and other portions thereof in the positions they occupy after the cradle has been charged with cement.

Figure 11 is a similar enlarged side elevational view of the cradle showing the parts thereof in the position they occupy during the cement settling or jolting operation.

Figure 12 is a sectional view taken on line 12—12 of Figure 10.

Figure 13 is a fragmentary sectional view taken on line 13—13 of the mold alone shown in Figure 12.

Figure 14 is a perspective view of another embodiment of my invention in which a single cement block may be produced, a workman being shown in the view to more clearly disclose the manner in which the cradle is operated.

Figure 15 is an enlarged perspective view of the single block mold.

Figure 16 is an enlarged sectional view of the mold taken on line 16—16 of Figure 15, one of the members for releasing the spring fingers connecting the removable side of the cradle body thereto being shown in open position.

Figure 17 is an enlarged transverse sectional view of a portion of the cradle adjacent the lever for applying a downwardly-acting force to the cement.

Figure 18 is a side elevational view of another form of the invention which may be termed "axis operated," and an adjacent portion of a roller conveyor.

Figure 19 is a similar view of the cradle upon being rocked in the direction of the arrow indicated therein.

Figure 20 is a similar view showing the cradle in the position it occupies when it has rocked in the reverse direction into engagement with an abutment.

Figure 21 is a similar view illustrating the lower portion of the cradle in the position it occupies when the cement form is discharged therefrom.

Figure 22 is a perspective view of the cradle and of forms adapted to be produced therein resting upon the roller conveyor.

Figure 23 is a perspective view of the pressure bar, the hopper being shown in dotted lines.

Figure 24 is a diagrammatic view showing the crank shaft and driving motor for rocking the cradle.

Figure 25 is a vertical sectional view of one of the pistons at one end of the hopper for applying force to the pressure bar.

Figure 26 is a perspective view of a metal jacketed fence post which may be formed in the cradle, a bed or cover for the post being also shown.

Referring more particularly to the drawings and especially to the form of the invention illustrated in Figures 1 to 13, inclusive, 1 indicates the body of the cradle which is adapted to be normally disposed in the upright position indicated in Figure 1. It is preferably formed with fixed side walls 2, a fixed bottom wall 3 and a fixed rear wall 4. A front side wall 5 is removably secured to the body so that the cement form which is produced therein may be easily discharged.

A mold 6 of any desired configuration may be removably secured in the body and form one of the walls of the cavity within which substantially fluid cement is charged. The removable or detachable wall of the body forms the side thereof opposite the mold so that, when it is detached or disconnected from the rest of the body, the cement form may fall away from the mold. Bolt 6a or other similar means adapted to extend into grooves in the sides of the mold may be employed for detachably securing it in the cradle.

The particular mold here illustrated for purposes of describing the invention is one for producing two cement blocks of the character designated 7 in Figure 8. Blocks of this kind are particularly suitable for forming a division line between a lawn and a driveway, for example, each having a comparatively wide horizontal upper surface 8 adapted to be arranged adjacent the lawn on which the wheel of a lawn mower may run and an upwardly projecting semi-cylindrical portion 9 adjacent the opposite side of the block. The opposite ends of each block are respectively formed with a recess 10 and a lug or the like 11 of the same size and shape of the recess so that, when the blocks are arranged in line, each will have a portion interfitting or interlocking with the adjacent block.

The mold may advantageously be formed of sheet metal so that it will be relatively light and can be easily carried from place to place. When in use, however, sand 12 or any other suitable material is placed within the hollow interior thereof so that it will possess the desired rigidity. For this purpose either the top or the bottom wall 13 of the mold is preferably removable therefrom, as shown in Figure 13, and the removable wall may, if desired, be made of wood.

Whereas here a single mold is used in the cradle from which two concrete blocks may be simultaneously produced, its front face is preferably formed with a channel portion 14 for receiving the inner edge of a plate 15 dividing the blocks.

Instead of merely having the end walls 2 of the cradle body define the sides of the mold surfaces, it is preferred to employ separate plates 16 and 17, respectively, for this purpose. The inner ends of these plates may, as shown in Figure 12, extend into recesses formed in the corners of the sheet metal mold and they extend outwardly therefrom to the removable side wall 5. The plate 16 as well as one face of the plate 15 is inclined, as indicated at 18, so as to produce a similarly inclined surface on the cement block whereby it will be wider at its base than at its top. This not only permits the blocks to easily discharge from the cradle but prevents the blocks from working out of the ground once they have been buried up to their top surfaces.

Separate upper and lower plates 19 and 20, respectively, may also be employed to form the ends of the mold instead of relying upon corresponding parts of the cradle body. The upper plate 19 is formed on its under side with pattern portions 21 which have the same cross sectional shape as the blocks to be molded, each of the portions including a projection 22 to form the recess 10 in the adjacent end of the block. The mold portions for the blocks on the under side of the upper plate 19 are separated so as to receive the dividing plate 15. The lower mold plate which rests on the bottom wall 3 of the body is formed with recesses 23 to form the contacting ends of the cement blocks with the protuberances 11 which can fit into the recesses in the opposite faces of the blocks.

At its upper and lower edges, the removable side 5 is formed with laterally spaced angle clips 24 which are adapted to overlap opposite faces of the dividing plate 15 and thus hold it in position. Pallet boards 25 may, if desired, be arranged on the inner face of the side wall 5 on which the cement blocks may be supported after removal from the cradle while the cement is thoroughly drying.

When the cradle is in its normal upright position shown in Figures 1 and 6, resting on the lower edges of the side walls 2, and the various parts forming the mold cavity are positioned in the cradle as described, cement is introduced therein in substantially fluid condition. One of each of the lower corners of the side walls is rounded, as indicated at 26, so that the cradle may be rocked thereon by a workman engaging a handle or bail 27 disposed adjacent the opposite side of the cradle and extending upwardly above the cradle body. By rocking the cradle forwardly into a position, such as shown in Figure 2, and then returning it to its upright position in such manner as to cause it to forcibly strike the ground or abutment, the cement therein is jolted and thus by action of gravity is caused to settle into a compact mass. The rocking of the cradle to and from an abutment or a point of vibration, which action may be termed "one way vibration," causes the least undesirable disturbance in the condensed mass and does not undo the work gained in previous vibrations, thus each succeeding vibration only adds to the compactness of the mass being molded.

A transversely extending member 28 may be secured to the cradle adjacent the bottom to increase the area thereof which is adapted to be struck against the ground so that a force of sufficient violence may be obtained.

To impart an additional downwardly acting force to the cement during the rocking operation to further compact the mass, mechanism including a treadle or foot piece 29, to which a workman may apply force with his foot (as shown in Figure 3) each time the cradle is jolted, is movably mounted on the cradle. Secured to opposite ends of the treadle are levers 30 which are pivotally mounted adjacent their inner ends on the sides of the cradle by pins 31, a plate-like bracket 32 being secured to each of the sides in overlapping relation to the outer face of the adjacent lever to afford a support for the outer end of the adjacent pivot pin 31.

Pivotally connected to the levers 30 intermediate the treadle 29 and the pivot pins 31 is a U-shaped member or bail 33 which is adapted, when the levers are moved downwardly by the treadle, to apply force to the top plate 19 to which the upper pattern sections 21 are secured on the under side. The upper surface of the top plate, designated 34 in Figures 10 and 11 may be formed with a recess 35 in which the top horizontal portion 36 of the bail may be positioned as shown in Figure 11. As the pattern sections 21 of the top plate have the same configuration as the cement forms being produced, they not only engage the top of the cement in the mold but are adapted to be forced into them to compress the cement when force is applied to the plate by operation of the treadle 29.

The levers 30 may also be employed as means for releasing pivot catches or hooks 37 mounted on opposite sides of the cradle to engage pins 38 which project laterally from the removable wall 5, the pins being adapted to extend within recesses 39 formed in the front edges of the side walls 2. The upper one 40 of these hooks is pivotally mounted between its ends while the lower hook 41 is pivotally mounted at its inner end, being connected to the bracket 32. A rod 42 at each side of the cradle is so connected to the catches that movement thereof will cause the catches to pivot in opposite directions. A tension spring 43 encircling the lower portion of the rod 42 being connected at one end to an abutment 44 on the side of the cradle and at its other end to the lower catch, the catches are normally maintained in locking position as shown in Figure 11. The extremities of the levers 30 which extend beyond the pivots 31 are adapted to engage an abutment 45 rigid with the rod so that, when the levers are moved upwardly, the rod is caused to move against the action of the spring and move the catches into open or releasing position, as shown in Figure 9. This abutment on the rod may be conveniently formed by a pair of nuts 46 which, by being screw threaded on the rod, can be adjusted to the desired position.

After the cradle has been rocked back and forth to cause the cement therein to settle into a compact mass and sufficient additional downward force has been imparted to the mass so that its compactness is assured, the cradle may be rocked forwardly into the position shown in Figure 4 where the removable side wall 5, in effect, forms the bottom of the cradle. Thereafter the treadle may be operated either by foot or hand into the position indicated in Figure 9 so as to release the catches from the front wall. The cradle may then be moved back into its upright position, leaving on the ground the side wall 5, the pallet boards 25 and the completed molded form, as shown in Figure 5.

In order that the bail 33 may be held in a position where it will not interfere with rocking the cradle forwardly to discharge the mold and also not interfere with the charging of cement into the mold, brackets 47 are rigidly secured to the upright portions of the handle 27, each of which is provided with an upper ledge 48 and a lower ledge 49. The upper ledge is so positioned that, when the treadle has been moved into the position for releasing the catches shown in Figure 9, the bail 33 may be moved to rest thereon, hooks 50 being pivotally mounted adjacent the brackets to engage the upstanding reinforcing flange thereof to hold the bail in place.

When the cradle is returned to its upright position after the cement form has been discharged therefrom, it is desirable that the catches 37 move into operative position with the pins 38 of the wall 5 and yet that the bail 33 be held out of the way. This is accomplished by moving the bail into engagement with the lower ledge 49 when, as shown in Figure 11, the hooks will have returned to operative position. As soon as the cradle is charged with cement, the upper mold plate 19 is placed in position, the removable cover applied and the bail 33 removed from the lower supporting ledge 49 into position where it can engage the cover, as shown in Figure 11, so that a downward force applied to the treadle by a workman will be transmitted to the cement within the cradle.

The embodiment of the invention shown in Figures 14 to 17, inclusive, is a cradle in which a single cement form may be produced, such as the block 7 for example. This cradle may advantageously be formed by a pair of side frame members each including uprights 51 and 51a, respectively, and horizontal bars 52 connecting them. The uprights 51a of both side frames extend upwardly above the top horizontal bars 52 and terminate in inwardly extending portions 53 rigidly connected, as by welding, by a handle portion 54. The side frames may also be advantageously connected at their lower corners by bars 55 and 56. The frames are also connected by a sheet metal lining 57 of the mold.

As in the form of the invention first described, this cradle is provided with a removable side wall 58 so that the form molded in the cradle may be readily discharged therefrom. This wall may define one of the sides of the cavity in which cement is introduced in a substantially fluid condition. The side of the cavity opposite plate 58 is formed by a mold 59 which is of the same character as the mold 6 heretofore described except, of course, that it is designed for forming a single block instead of two blocks. One of the other sides of the mold cavity may be defined by a wall 60 of the sheet metal lining and the side opposite may be defined by a removable pattern board 61 to impart an inclined surface to the cement block. These last mentioned sides of the cavity may be formed by sheet metal walls of the lining which diverge toward the removable plate 58, as seen in Figure 16, so that the cement form, after partial solidification, may be easily discharged or removed from the cradle and, in cases where it is desired to produce a cement form in which the faces thereof are at 90° to each other, plain side boards may be used engaging the sheet metal lining which are inclined reversely. The sides 2 of the cradle in the form of the invention first described may, of course, be similarly inclined so that they will diverge outwardly toward the removable wall 5.

With the handle 54, the cradle may be rocked about the rear bar 55, as indicated in Figure 14, to jolt the cement therein and to cause it to settle in a compact mass. In addition the cradle is provided with a pivoted lever 62 by which an additional downward force may be transmitted to the cement being molded.

The lever 62 may advantageously have an upwardly opening substantially U-shaped portion at its inner end for engaging the under side of a rod 64 which extends between and is rigidly secured to the uprights 51a. Slidably mounted on the bar or lever is a block 65 which is adapted to engage the cover plate 66 of the mold, the block being secured to the lever in a desired position.

The outer end of the pivoted lever 62 is disposed beyond the body of the cradle so that it may be easily engaged by a workman to press downwardly thereon. Since the inner end of the lever is prevented from moving upwardly by engaging the rod 64 and the block 65 is in engagement with the cover plate of the mold, such downward pressure will be transmitted to the cement therein. In actual operation of a mold of this character, it will be found most convenient for the workman to rock the cradle in one direction by engaging the handle 54 and to rock it in the reverse direction by pressing downwardly on the outer end of the lever 62. It will thus be seen that the force employed to rock the cradle into engagement with an abutment and thereby jolt the cement imparts an additional downwardly acting force thereto. It is, of course, also to be understood that the entire rocking movement may, if desired, be accomplished by engaging the handle 54 alone.

The removable wall 58 is connected to the cradle by pairs of spring fingers 68 which are rigidly secured at their inner ends to the uprights 51a, as indicated at 69, and which are formed at their outer ends with inwardly projecting flanges 70 which, when in normal position, overlie the outer face of the wall 58 and thus hold it in place.

Spreaders 71 are pivotally mounted in each side frame to move the spring fingers outwardly into the position indicated at the right of Figure 16 so that the wall 58 is freed of the cradle. Each of the spreaders 71 is of substantially U-shape having a main body portion 72 and portions 73 offset from the pivotal axis thereof and engageable with the spring fingers so that, when the spreader is moved from the position it normally occupies as shown at the left of Figure 16 into the position shown at the right of that figure, the fingers are caused to move away from the front wall.

To remove or discharge the molded form from the cradle, it may be rocked forwardly just as in the case of the cradle described in the first embodiment of the invention, so that the removable wall 58 becomes, in effect, the bottom wall thereof. Thereafter the workman has but to rotate spreaders 71 to cause the spring fingers 68 to move from cooperation with the wall and then the cradle can be lifted, leaving the wall with the molded form resting thereon. A pallet board, such as the board 25, may, of course, be employed in this "one block" cradle.

In the form of the invention illustrated in Figures 18 to 26, inclusive, a cradle 74 is pivotally mounted on fixed supports designated 75 so that members, such as columns, fence posts, etc., may be easily formed therein.

The cradle consists of a body 76 which is detachably connected to a hopper 77 slidably mounted on a cement mixer 78 from which cement may be supplied to the cradle. The body and hopper are detachably connected, as indicated at 79, whereby the two can be rocked in unison, as indicated in Figures 19 and 20, or the body can be moved into substantially horizontal position as shown in Figure 21. The body consists of wall portions in which suitable molds or patterns may be disposed to form a cavity for receiving the cement and the front wall 80 is slidably mounted so that it may be slid from its normal closed position into the position shown in Figure 21 to permit the cement form to discharge from the cradle.

Below the axis 75 the cradle is formed with downwardly extending portions 81 on which a weight member or the like 82 is vertically slidable so that it may be positioned to engage an abutment 83. To effect this vertical adjustment, racks 84 may be conveniently formed on the downwardly extending portions 81 and pinions 85 engageable with the racks may be rotatably mounted on the weight members. It will, of course, be appreciated that the weight members may be adjusted to completely counterbalance the weight of the cradle so that only a small force is required to rock it.

Due to the weight of the cement forms which can be produced in the cradle, the cradle is preferably mounted adjacent a roller conveyor 86 and the abutment 83 may, if desired, be secured to the conveyor structure.

The cradle and hopper may be rocked back and forth by any suitable means to bring the weight 82 into engagement with the abutment and thus jolt the cement in the cradle, the particular mechanism here illustrated for that purpose consisting of a shaft which is adapted to be rotated by a motor 88 suitably mounted on fixed supports. The ends of the shaft are offset to form cranks 89 which are located in slots 90 in the outer end portions of levers 91 pivoted to the sides of the hopper, as indicated at 92. When the crank rotates, the offset ends 89 thereof move in a circular path, first causing the cradle to move in one direction as indicated in Figure 19, and then in the opposite direction as indicated in Figure 20. So that the cradle will not be subjected to abrupt shocks when its direction of movement is reversed, springs 93 are positioned within the slots 90 and bear against the offset ends 89 of the crank. These springs, the compression of which can be adjusted by set screws 94, permit the ends 89 to move within the slots and yet cushion or absorb the force accompanying the change in the direction of movement of the cradle.

In addition to engaging the abutment 83 during its rocking movement, means is preferably provided for imparting an additional downwardly acting force to the cement within the mold which may advantageously consist of a longitudinally extending pressure bar 95 which is connected at its ends to a pair of piston actuated members 96 disposed within housings 97. Slidably mounted within the members 96 are piston rods 98 which are pivotally connected at their lower ends to the levers 91. These rods are preferably hollow and may act as conventional pump rods, to increase the pressure within the housings 97 and force the members 96 downwardly as they reciprocate when the cradle is rocked.

After the cement mass within the cradle has been thoroughly compacted, the cradle is disconnected from the hopper 77 and moved into the substantially horizontal position shown in Figure 21. A shuttle 99 associated with the conveyor is then operated, pushing the front wall 80 of the cradle before it and moving beneath the molded form. When the shuttle is withdrawn, the molded form, resting upon it, moves out from cooperation with the cradle and is supported where it may be easily slid on to the rollers of the conveyor as shown in Figure 22. Upon return of the shuttle, the slidable wall 80 slides back within grooves in the sides of the cradle where it is held in its normally closed position during the rocking operation.

Instead of providing the cradle with a mold from which the cement is withdrawn after being compacted, it has been found desirable to provide it with a sheet metal mold which is adapted to form a jacket or casing for the molded cement when it is in use. Sheet metal jackets of a great variety of designs may, of course, be used in the cradle to produce the desired form but it is preferred that the jacket is sufficiently opened on the side which faces upwardly when it is in the cradle so that pressure from the member 85 may be transmitted thereto.

In addition to the cement forms shown in Figure 22 in substantially diagrammatic fashion, a fence post 100 which may also be easily formed in the cradle is shown in Figure 26. This post comprises a cement interior 101 and a sheet metal jacket 102 which on one face of the post is flanged as indicated at 103 to which wire fencing may be secured. At the opposite face of the post, the ends of the sheet metal jacket are spaced from each other to define a space through which pressure may be transmitted to the cement within the jacket. Each end of the sheet metal jacket is formed with an inclined flange 104 so that, when the cement hardens, the jacket is firmly held in place. A sheet metal cover 105 may, if desired, be used to cover the exposed cement of the post and its edges terminate in downwardly inclined flanges 106 so that the cover will be held in place, as indicated in dot and dash lines when the cement hardens. The cover, of course, is not applied to the post until after the post has been discharged from the cradle and at that time the cement is still sufficiently plastic that the cover may be readily applied.

In the jacketed cement forms shown in Figure 22, the flanged ends of the jacket which are embedded within the cement are shown at the left side of each form and the force transmitted to the cement within the jacket for compacting it is applied thereto in the space between the flanged ends.

The particular mold illustrated in the cradle of each embodiment of the invention has been chosen for illustrative purposes only and it will be evident to those skilled in the art that molds of any desired shape or form may be used.

Various modifications and changes may, of course, be made in the details of the structure here illustrated and described without departing from the spirit and scope of the invention as defined in the appended claims.

What I claim is:

1. A cradle for producing a cement form consisting of a movable body for receiving the cement in relatively fluid condition, said body being adapted to be rocked into and out of engagement with an abutment for jolting the cement therein to cause it to settle in a compact mass, means movable with said body for applying downward pressure to the cement therein when the body engages said abutment, a movable plate forming one of the side walls of the body affording a support for said form when the body is moved into a position for discharging it therefrom, and movable means releasably connecting a portion of the plate to the body to permit the plate to move relatively thereto and the form to be discharged therefrom.

2. A cradle for producing a cement form consisting of a movable body for receiving the cement in relatively fluid condition, said body being adapted to be rocked into and out of engagement with an abutment for jolting the cement therein to cause it to settle in a compact mass, means movable with said body and having a portion disposed above the cement deposited therein for applying a downwardly acting force thereto when the body engages said abutment, a removable plate forming one of the side walls of the body and providing a support upon which the form rests when the body is moved into a position to permit the discharge of the form therefrom, and movable means for disconnecting the plate from the body to permit the form to be discharged.

3. A cradle for producing a cement form consisting of a movable body for receiving the cement in relatively fluid condition, means on the body engageable by an operator for rocking the body to cause it to forcibly engage an abutment to jolt the cement therein and cause it to settle in a compact mass, means pivoted on said body for applying a downwardly acting force to the cement when said body is brought into engagement with said abutment, said means being movable in a direction to cause said body to engage said abutment, a releasable plate forming one of the side walls of said body adapted to provide a support on which the form rests when the cradle is moved into a position in which said wall becomes the bottom wall of the body, and means for releasing said plate so that the form can be discharged from the body.

4. A cradle for producing a cement form consisting of a movable body for receiving the cement in relatively fluid condition, said body having a bottom on which it rests when in upright position, means on the body spaced above said bottom engageable by an operator for rocking said body on an axis adjacent one of its bottom edges and for forcibly returning it to its upright position to jolt the cement and thereby cause it to settle in a compact mass, and means movably mounted on said body for applying pressure to the cement therein during the jolting operation and causing it to settle in a compact mass.

5. A cradle for producing a cement form consisting of a movable body for receiving the cement in relatively fluid condition, said body having a bottom on which it rests when in upright position, means on the body spaced upwardly from said bottom engageable by an operator for rocking said body on an axis adjacent one of its bottom edges and for forcibly returning it to an upright position to jolt the cement and thereby cause it to settle in a compact mass, and means mounted on the body and movable in a direction to return the body to upright position for applying a downwardly acting force on the cement to supplement the settling force transmitted thereto during the jolting operation.

6. A cradle for producing a cement form consisting of a movable body for receiving the cement in relatively fluid condition, means spaced above the bottom of said body engageable by an operator for rocking it back and forth to move it out of and forcibly into engagement with an abutment for jolting the cement to cause it to settle in a compact mass, and means on said body movable in a direction to cause said body to engage said abutment for applying pressure to the cement therein during the jolting operation.

7. A cradle for producing a cement form consisting of a body having a cavity for receiving cement in relatively fluid condition, said body being provided with means spaced above the bottom thereof for rocking it about one of its bottom edges into and out of engagement with an abutment for jolting the cement therein to cause it to settle in a compact mass, a mold within the body forming one of the sides of said cavity, means mounted on the body and manually operable during the jolting operation to transmit a downwardly acting force to the cement, a plate forming a side wall of the body opposite said mold and movable means releasably connecting said plate to the body whereby the cement form may be discharged from the body.

8. A cradle for producing a cement form consisting of a movable body for receiving the cement in relatively fluid condition, said body being adapted to be normally disposed in an upright position, means on the cradle whereby it may be rocked on an axis adjacent one edge thereof and forcibly returned to upright position to jolt the cement and cause it to settle in a compact mass, and foot operated mechanism adapted to be actuated when the cradle is returned to upright position to transmit to the cement an additional downwardly acting force.

9. A cradle for producing a cement form consisting of a movable body for receiving the cement in relatively fluid condition, said body being adapted to be normally disposed in an upright position, a removable cover for the body, means on the body spaced above the bottom thereof whereby the body may be rocked on an axis adjacent one edge thereof and forcibly returned to upright position to jolt the cement and cause it to settle in a compact mass, and means operable upon the return of the cradle to upright position for transmitting an additional downwardly acting force to the cement therein, said means being movable in a direction tending to cause the body to assume upright position and including levers pivotally mounted on the body and foot operated means pivotally connected to the levers cooperable with said removable cover of the cradle whereby the downwardly acting force transmitted to the levers is transmitted to the cement through said cover.

10. A cradle for producing a cement form consisting of a movable body for receiving the cement in relatively fluid condition, means on the body engageable by an operator for rocking it back and forth to move it out of and forcibly into engagement with an abutment for jolting the cement to cause it to settle in a compact mass, and treadle operated means movably mounted on said body engageable by the operator for transmitting an additional downwardly acting force to the cement when it is jolted.

11. A cradle for producing a cement form consisting of a movable body for receiving the cement in relatively fluid condition, means on the body engageable by an operator for rocking it back and forth to move it out of and forcibly into engagement with an abutment for jolting the cement to cause it to settle in a compact mass, a removable plate forming one of the side walls of said body, movable locking members securing the plate to the body, and treadle means pivotally mounted on the cradle movable in one direction to apply a downwardly acting force to cement within the body and movable in the opposite direction to actuate said locking members to free them from cooperation with said plate.

12. A cradle for producing a cement form consisting of a movable body for receiving the cement in relatively fluid condition, means on the body engageable by an operator for rocking it back and forth to move it out of and forcibly into engagement with an abutment for jolting the cement to cause it to settle in a compact mass, a removable plate forming one of the side walls of said body, treadle means pivotally mounted on the cradle movable in one direction to apply a downwardly acting force to the cement within the cradle and movable in the opposite direction to release said plate from the body.

13. A cradle for producing a cement form consisting of a movable body for receiving the cement in relatively fluid condition, means on the body engageable by an operator for rocking it back and forth to move it out of and forcibly into engagement with an abutment for jolting the cement to cause it to settle in a compact mass, a removable cover for the body, levers pivotally mounted on opposite sides of the body, a U-shape member engageable with said cover and pivotally connected to said levers, and means connected to said levers affording a treadle whereby said levers may be actuated to cause said U-shape member to move downwardly and transmit a corresponding force to said cover to impart an additional settling force to the cement.

14. A cradle for producing a cement form consisting of a movable body for receiving the cement in relatively fluid condition, means on the body engageable by an operator for rocking it back and forth to move it out of and forcibly into engagement with an abutment for jolting the cement to cause it to settle in a compact mass, a removable cover for the body, levers pivotally mounted on opposite sides of the body, means pivotally connected to the levers for imparting a force therefrom causing the cover to exert a downward pressure upon the cement, and holding means mounted on the cradle for maintaining said last named means in an inoperative position.

15. A cradle for producing a cement form consisting of a movable body for receiving the cement in relatively fluid condition, means on the body engageable by an operator for rocking it back and forth to move it out of and forcibly into engagement with an abutment for jolting the cement to cause it to settle in a compact mass, a lever pivotally mounted on said cradle having a portion projecting beyond one side thereof engageable by a workman whereby a downwardly acting force may be imparted to the handle for transmission to the cement within the mold, said lever being movable in a direction to cause the body to engage said abutment.

16. A cradle for producing a cement form consisting of a movable body for receiving the cement in relatively fluid condition, means on the body spaced above the bottom thereof, engageable by an operator for rocking it back and forth to move it out of and forcibly into engagement with an abutment for jolting the cement to cause it to settle in a compact mass, and mechanism for applying a downwardly acting force to the cement supplementary to the force transmitted thereto by said jolting, said mechanism including a lever pivotally mounted on the cradle and having a portion engageable by an operator, said portion being operable to assist the operator in rocking said body into engagement with said abutment.

17. A cradle for producing a cement form consisting of a movable body for receiving the cement in relatively fluid condition, said body being pivotally mounted so as to be swung into and out of engagement with an abutment for jolting the cement therein to cause it to settle in a compact mass, a hopper device removably connected to said body through which cement is supplied to the latter, and means removably connecting the cradle to the hopper whereby it may be rotated relatively thereto to permit the cradle to assume a position in which the cement form may be discharged therefrom.

18. A cradle for producing a cement form consisting of a movable body for receiving the cement in relatively fluid condition, said body being pivotally mounted so as to be swung into and out of engagement with an abutment for jolting the cement therein to cause it to settle in a compact mass, a hopper device removably connected to said body through which cement is supplied to the latter, means connected to the hopper for rocking it and the body in unison, and means removably connecting the hopper and body whereby the body may be moved relatively to the hopper to assume a position in which the cement form may be discharged therefrom.

19. A cradle for producing a cement form consisting of a movable body for receiving cement in relatively fluid condition, said body having relatively flat bottom portions adapted to rest on a support and to maintain the body in a substantially upright position, means spaced above said bottom portion engageable by an operator for rocking the body about one of the bottom edges thereof to cause the bottom portion to forcibly re-engage said support and thereby jolt the cement therein to cause it to settle in a compact mass, and means movably mounted on the cradle for applying pressure to said cement each time the body is jolted.

20. A cradle for producing a cement form consisting of a body for receiving the cement in a relatively fluid condition, means carried by the body engageable by an operator for rocking it back and forth into engagement with an abutment for jolting the cement therein to thereby cause it to settle in a compact mass, means for applying pressure to the cement in said body during the jolting operation, said means being movable in a direction to cause said body to engage said abutment, and means for supporting said pressure applying means in an inoperative position.

JOSEPH C. GRETTER.

REFERENCES CITED

The following references are of record in the file of this patent:

UNITED STATES PATENTS

| Number | Name | Date |
| --- | --- | --- |
| 47,253 | Burns | Apr. 11, 1865 |
| 795,370 | Shone | July 25, 1905 |
| 805,457 | Francisco | Nov. 28, 1905 |
| 805,642 | Geers et al. | Nov. 28, 1905 |
| 848,697 | Silva et al. | Apr. 2, 1907 |
| 1,526,893 | Balaam | Feb. 17, 1925 |
| 1,574,565 | Ferguson | Feb. 23, 1926 |
| 2,193,847 | Strong | Mar. 19, 1940 |
| 2,303,884 | Krehbiel et al. | Dec. 1, 1942 |